United States Patent
Das et al.

(10) Patent No.: US 7,949,654 B2
(45) Date of Patent: May 24, 2011

(54) SUPPORTING UNIFIED QUERYING OVER AUTONOMOUS UNSTRUCTURED AND STRUCTURED DATABASES

(75) Inventors: Gautam Das, Irving, TX (US); Mukesh Kumar Mohania, New Delhi (IN); Ullas Balan Nambiar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 12/059,350

(22) Filed: Mar. 31, 2008

(65) Prior Publication Data

US 2009/0248619 A1 Oct. 1, 2009

(51) Int. Cl.
G06F 7/00 (2006.01)
G06F 17/30 (2006.01)
(52) U.S. Cl. ......................... 707/718; 707/719
(58) Field of Classification Search .................. None
See application file for complete search history.

(56) References Cited

U.S. PATENT DOCUMENTS

| | | | |
|---|---|---|---|
| 6,931,418 B1* | 8/2005 | Barnes | 707/776 |
| 6,980,976 B2 | 12/2005 | Alpha et al. | |
| 7,082,427 B1* | 7/2006 | Seibel et al. | 707/661 |
| 7,146,356 B2 | 12/2006 | Choi et al. | |
| 7,209,923 B1 | 4/2007 | Cooper | |
| 7,756,822 B2* | 7/2010 | Danner et al. | 707/602 |
| 2003/0041047 A1 | 2/2003 | Chang et al. | |
| 2003/0233365 A1* | 12/2003 | Schmit et al. | 707/100 |
| 2004/0230571 A1* | 11/2004 | Robertson | 707/3 |
| 2006/0053133 A1 | 3/2006 | Parkinson | |
| 2006/0074881 A1 | 4/2006 | Vembu et al. | |
| 2006/0179432 A1* | 8/2006 | Walinga et al. | 717/171 |
| 2007/0011134 A1 | 1/2007 | Langseth et al. | |

* cited by examiner

*Primary Examiner* — Susan Y Chen
(74) *Attorney, Agent, or Firm* — Gibb I.P. Law Firm, LLC; Derek S. Jennings (57) ABSTRACT

Methods, systems and computer products perform cost estimate to determine an efficient approach to answer a query according to one of several unified query plans. One unified query plan involves querying an unstructured database, referencing a unified index, and probing a structured database based on matches discovered in the unified index. The results of the unstructured database query are used to lookup entries in a unified index associated with the structured database. Then the structured database is probed by querying only the subset of the structured database gleaned from the unstructured database query.

12 Claims, 10 Drawing Sheets

SUPPORTING UNIFIED QUERYING OVER AUTONOMOUS UNSTRUCTURED AND STRUCTURED DATABASES

BACKGROUND

1. Field

The present invention relates to management and access of digital data, and more specifically, to systems, methods and computer products for conducting data searches in both structured and unstructured data sources.

2. Description of Related Art

Information content in an enterprise can be structured or unstructured. For example, structured content may include data for payroll, sales orders, invoice, customer profiles, or the like. Unstructured content includes items such as emails, reports, web-pages, complaints, information on sales, customers, competitors, products, suppliers and people. Historically, structured and unstructured data management technologies have evolved separately due to the natural separation between these two kinds of information, and because different users tend to access structured data versus unstructured data.

Methodologies used for searching structured data generally do not work well for unstructured data. Similarly, it would be inefficient to apply search methodologies of unstructured data for structured data. For example, a company may wish to use its repository of email communication (unstructured) to discover the identity of any customers from Delhi who have sent threatening emails. A conventional way of doing this would be to search for all emails that have the keyword "threaten," and then from each returned document, extract information that can help identify the originating customer (e.g. cust-id). This information, in turn, could be used to search the company's customer database (for example a cust-id database) in an effort to output a list of customers who reside in Delhi and who have made threatening complaints. With this convention approach, however, it is very inefficient to discover relationships between structured and unstructured data at query time. The application has to decompose the two queries into subqueries, and then federate it to the different data sources, e.g., SQL subqueries that execute against the structured database, and keyword queries that execute against the unstructured database. Furthermore, query optimization has to be carried by the application, since there may be many different ways in which the two queries can be decomposed and federated.

What is needed is a unified system for querying both structured data content and unstructured data content.

SUMMARY

Embodiments disclosed herein address the above stated needs by providing systems, methods and computer products for querying, retrieval and analysis of both structured content and unstructured content.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Most companies or other organizations, and even individuals, maintain a number of autonomous repositories of data. Autonomous repositories often include content which, although related, is not cross-referenced or otherwise indexed to each other, according to conventional technologies. The data kept in two different autonomous repositories is often stored in two different formats. Content across autonomous repositories of structured data and unstructured data often have relationships. For example, customers' email complaints stored in a text repository are related to the corresponding customer profiles stored in a database. However, conventional applications do not adequately meet the needs of querying both structured data content and unstructured data content, both of the structure types in which data may be kept. The various embodiments disclosed herein overcome these drawbacks, providing a unified application for querying, retrieval and analysis of structured content and unstructured content. This application is useful in a number of typical scenarios. For example, various embodiments can be used by a company to list complaints of all platinum customers (or other customer subset) in the past month. The various embodiments are flexible and can easily be configured to perform either narrower or broader searches. For example, various embodiments can be used to list all high-valued customers from Delhi who have made threatening complaints. The various embodiments are also very well suited to perform data mining and analysis, for example, to determine from complaint logs whether Delhi customers are more prone to attrition as compared to Mumbai customers.

Various embodiments disclosed herein may be implemented as a middleware solution that overcomes many of the complexities of unified querying over autonomous and heterogeneous (structured and unstructured) data stores. This is done by providing a unified query interface/API that can be exposed to applications, and a unified index persisted and maintained in middleware that relates and indexes the content of two repositories. An optimizer that uses the unified index is used in some embodiments to plan the execution of unified queries. The results of the unified query may be accorded a default ranking as an indication of relevance or other quality related factor. Various embodiments serve to leverage relationships across autonomous repositories containing overlapping information about common entities (items). Efficiencies and benefits are provided by the middleware functionality of the various embodiments, for example, by providing pre-computation of the unified index so that applications will not have to discover these relationships at runtime. These indexes can be shared across multiple other applications, thus relieving the other applications of responsibility for query optimization and query federation.

Various embodiments provide a keyword like query interface in which each unified query consists of two parts—one part that is a keyword query over the unstructured repository, and another part that is a keyword-like query over the structured database which may refer to dimension values as well as fact table names. The following is an example format of the two part keyword query: {{threaten} {Delhi, CustTbl}}. Using this querying format provides benefits to data-intensive applications used in conjunction with various embodiments disclosed herein. For example, applications do not have to either extract, or refer to the relationships between structured and unstructured data. A further advantage is that applications do not have to optimize the query execution since this is handled by the middleware solution performing the unified query.

Figure 1:
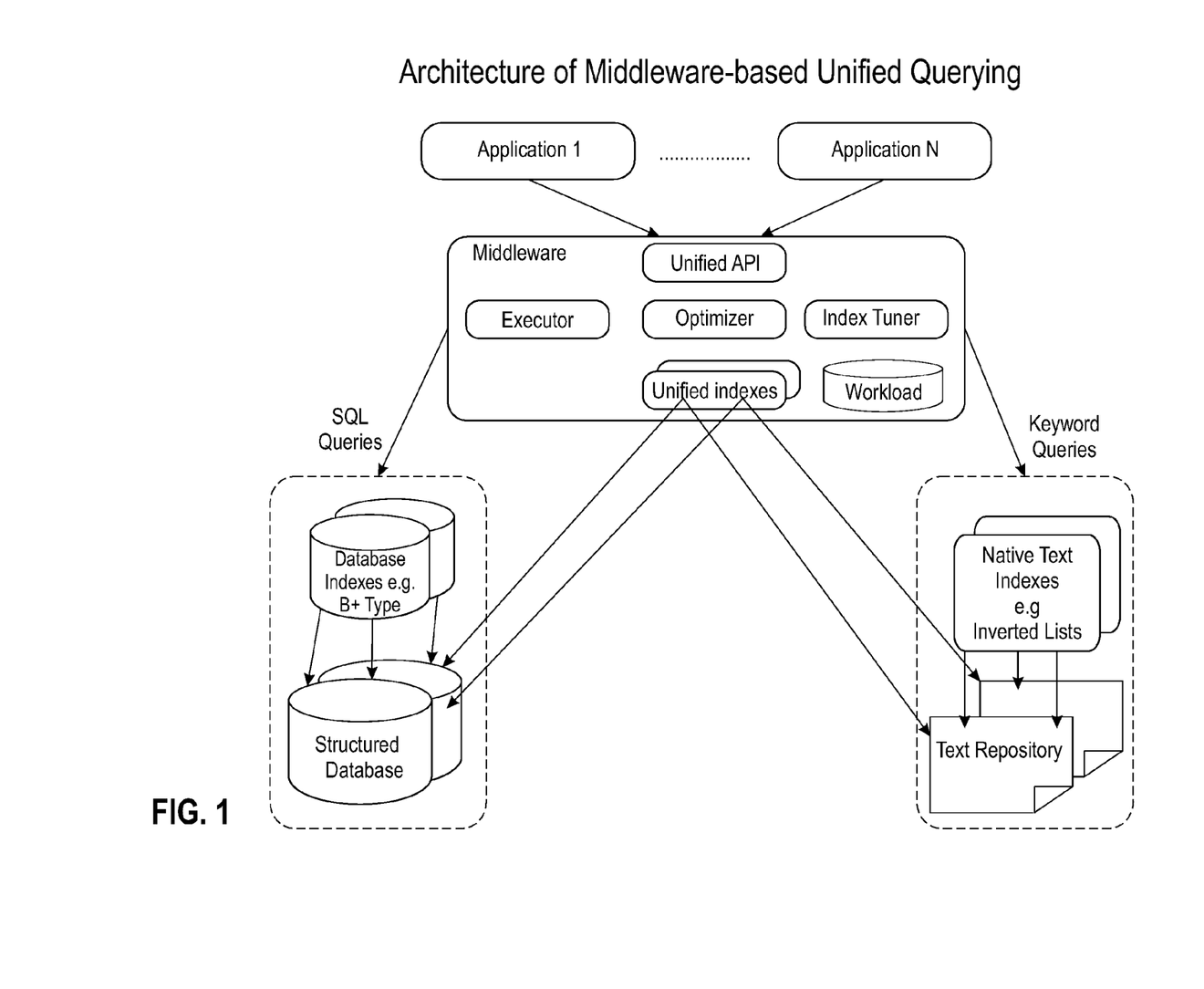
FIG. 1 depicts an exemplary architecture for middleware-based unified querying according to various embodiments of the invention.
Figure 2A:
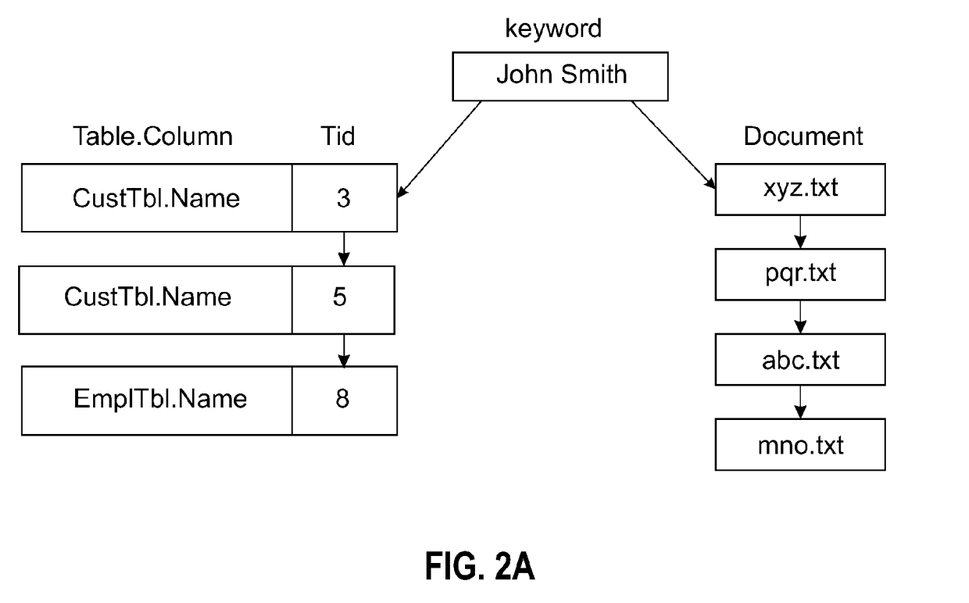
FIGS. 2A-B depict examples of explicit relationships and implicit relationships maintained by various embodiments of the unified index.

FIG. 2A depicts an example of explicit relationships maintained by various embodiments of the unified index. In accordance with various embodiments, the structure of the unified index has both explicit relationships and implicit relationships. FIG. 2A depicts explicit relationships for an exemplary identifier, the keyword "John Smith." The unified index has an entry for each unique identifier/keyword that co-occurs in both databases, and keep pointers to the locations in each database. For example, a proper name may be explicitly specified in several emails, as well as exist in several locations within the structured database. Frequency of occurrence statistics may also be maintained with each entry, such as Term Frequency (TF) and Inverse Document Frequency (IDF) to compute TF-IDF scores, or we can compute frequency of keywords appearing in queries to index the frequently asked (popular) queries. These and other types of statistics may be used in calculating a cost estimate for determining an efficient unified query approach (e.g., which unified query plan to use).

Figure 2B:
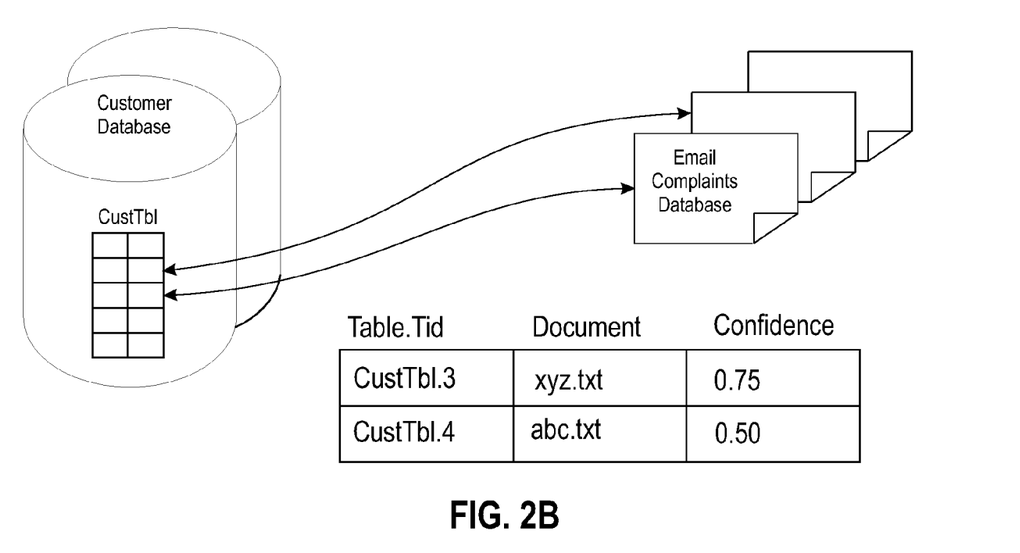

FIG. 2B depicts an example of implicit relationships maintained by various embodiments of the unified index. The unified index can maintain a list of (entity, document) pairs, signifying that the document is implicitly related to that entity. For example, a document such as an email may have been written by a customer, but the customer ID may not be explicitly mentioned in the email. An entity can refer to a tuple-Id of a fact table (e.g., transactions, customers, stores, etc are all entities), since, typically, all dimensions of each fact table are known, or can be derived. It should be noted that such relationships can be discovered using third-party annotation and/or Named Entity Recognition (NER) tools during a preprocessing step. Since such relationships are not always derived with absolute certainty, each pair may be associated with a real-valued Confidence. Each entity/document may have associated statistics of the number of corresponding documents/entities it is linked with.

To discover explicit relationships for the unified index both databases—that is, the structured database and the unstructured data repository—may be crawled to find out the common unique values, their locations, and statistics. Any explicit relationships discovered may be materialized in a separate database hosted in the middleware server. However, in order to optimize performance, if the native indexes of unstructured repository are based on inverted lists and are accessible externally, then there may not be a need to keep the duplicate inverted list in the middleware unified index. For example, there is no need to keep all doc-ids that have "John Smith" if they are retrievable via a keyword query.

To discover implicit relationships for the unified index, a relationship builder may be used, which, given a structured and unstructured database, determines all (entity, document) pairs and the corresponding confidences.

Execution of a given unified query may be carried out in a number of different manners using the various embodiments. Three implementations, labeled Plan 1, Plan 2, and Plan 3, are respectively depicted in FIGS. 4A-B, 5A-B and 6A-B and discussed below in conjunction with these figures.

Figure 3:
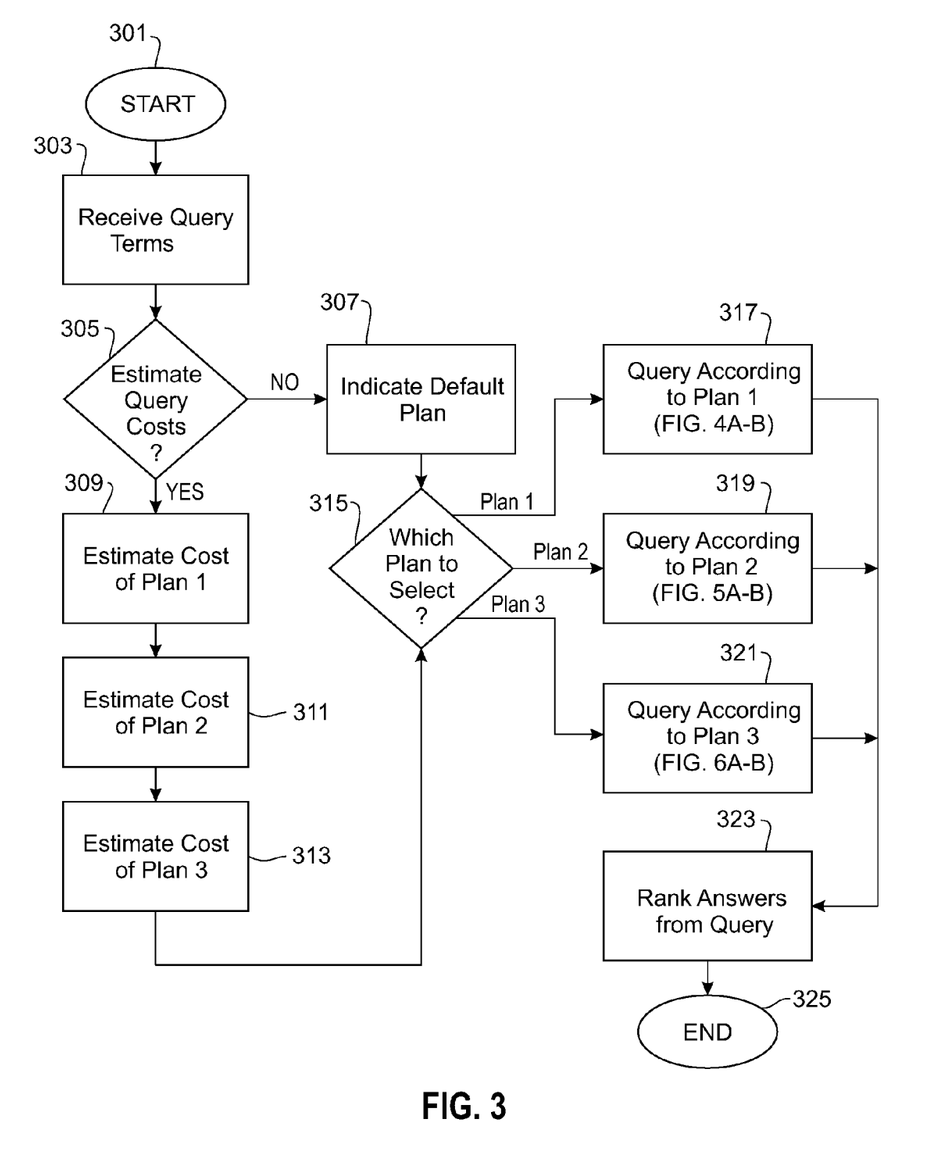
FIG. 3 depicts an exemplary method for determining the most efficient unified query plan according to various embodiments of the invention.

FIG. 3 depicts an exemplary method for dynamically determining and selecting the most efficient unified query plan according to various embodiments of the invention. By dynamically determining and selecting, it is meant that the determination of which unified query plan to use is performed and that plan is selected at the time of the query, rather than using a default plan specified ahead of time. Each unified query embodiment entails queries in both structure types of data, that is, both a query of structured data and a query of unstructured data. These two types of queries are typically done in a structured repository (sometimes a database) and an unstructured repository. However, in some situations the structured data and the unstructured data may both be stored within the same database. Further, some instances may involve multiple queries of the structured data and/or the unstructured data, so long as at least one query is performed in the structured data and one query is performed the unstructured data. The query of the structured database may take the form of an SQL query. Other languages or software may be used to perform the structured database query as well. One typical query of the unstructured repository is a keyword query. Other types of queries for the unstructured repository may be used also, such as a comparison of values, numbers or other entries, or the like.

The method of FIG. 3 begins at 301 and proceeds to 303 to receive the unified query. Returning to the example discussed above in the Background, a company may wish to use its unstructured repository of email communication to discover the identity of any customers from Delhi who have sent threatening emails. The unified query for this situation may take the exemplary form {{threaten} {Delhi, CustTbl}}, although other formats may be used so long as the desired keywords and/or field for the query are specified. In this example "threaten" is the query term to be used in the unstructured repository of all emails and the terms "Delhi" and "CustTbl" pertain to the structured database. The word "threaten" may be a word to be searched for within the email text itself, or may be a meta data label attached to the email upon receipt categorizing it as a threatening email (e.g., threatening to take business to another company), or may be any other data or data categorization within or associated with the content (e.g., emails).

Once 303 has been completed and the query terms have been received the method proceeds to 305 to determine whether a cost estimate is to be performed for the query. In accordance with various embodiments there may be more than one query plans available to carry out the unified query. For example, FIGS. 4-6 describe three different query plans, Plan 1, Plan 2 and Plan 3. A cost estimate may be performed in an effort to select the optimal query plan for carrying out the unified query. In some situations it is possible to create a cost estimate for each of these three unified query plans, while in other instances a cost estimate for one or more of the plans may not be feasible (e.g., if the parameters needed for the cost estimate are unknown or thought to be inaccurate). If no cost estimate is available, or the cost estimate is not to be performed for some other reason, the method proceeds from 305 along the "NO" path to 307 to retrieve the plan indicated as a predefined default plan—that is, the unified query plan to use in case the cost estimate is unavailable or another means of selecting a plan is to be used (e.g., the default plan is to be used). In some implementations the system may be preconfigured to use a particular plan, (e.g., Plan 1) without making any cost estimate. Once the indication of which default plan to use has been retrieved in 307 the method proceeds to 315. Returning to block 305, if the system is set to perform a cost estimate and the needed parameters are available the method proceeds from 305 along the "YES" path to 309.

In 309 a cost estimate for Plan 1 is calculated. Plan 1 first searches in the unstructured repository, then uses the unified index to lookup the terms, using the result to probe into the structured database. (Plan 1 is described in further detail in conjunction with FIGS. 4A-B). In general, Plan 1 tends to be more efficient (e.g., low cost) if the expected results from the unstructured content is small. One method of estimating the Plan 1 query cost for the above example is to let NumEmails (threaten) be the number of documents with keyword threaten, and let NumCust(threaten) be the number of customers that have sent these emails. (In practice, this exercise can be performed for a number of words thought to be threatening rather than just for the word "threaten"). NumEmails (threaten) can be determined from the explicit index statistics or from the native index of the text search engine. Assuming the independence of these two variables, NumCust (threaten)=NumEmails(threaten)/AvgEmailsPerCust, where AvgEmailsPerCust is stored in the unified index (e.g., essentially, the average left degree of the bipartite graph that defines implicit relationships). Even if the customers who have sent threatening emails are not independent from all the threatening emails, this equation should provide a rough estimate sufficient for the purposes of estimating the costs of the plan. Then the number can be estimated for the customers that are from Delhi that have sent the threatening emails. This can be done by letting NumCust(Delhi, threaten) be the number of customers from Delhi that have sent these threatening emails. The SQL optimizer can be queried to estimate the FracCust(Delhi), (i.e., the fraction of customers from Delhi). Then, again assuming independence, NumCust(Delhi, threaten)=NumCust(threaten)*FracCust(Delhi). The cost estimate of Plan 1=w1*NumEmails(threaten)+ w2*NumEmails(threaten)+w3*NumCust(Delhi, threaten) where w1, w2, w3 for Plan 1 estimate the unit costs of accessing the unstructured repository, unified index and structured database, respectively. Cost estimates for Plans 2 and 3 are performed in a similar manner.

Once the cost estimate for Plan 1 is complete in 309 the method proceeds to 311 to produce a cost estimate for Plan 2. Plan 2 first searches in the structured database, then uses the unified index to lookup the terms, using the result to probe into the unstructured repository. (Plan 2 is described in further detail in conjunction with FIGS. 5A-B). Plan 2 tends to be more efficient if the expected results from the structured content is small. For example, the cost estimate of Plan 2=w1*NumCust(Delhi)+w2*NumCust(Delhi)+w3*Num Emails(Delhi, threaten) where w1, w2, w3 for Plan 2 estimate the unit costs of accessing the structured database, unified index and unstructured repository, respectively.

Once the cost estimate for Plan 2 is complete in 311 the method proceeds to 313 to produce a cost estimate for Plan 3. Plan 3 separately searches both, the structured database and the unstructured repository, then performing a lookup in the unified index to determine in-between links. (Plan 3 is described in further detail in conjunction with FIGS. 6A-B). Plan 3 tends to be more efficient if the results from both the unstructured and the structured content are expected to be small. The cost estimate of Plan 3=w1*NumEmails (threaten)+w2*NumCust(Delhi)+w3*(NumEmails (threaten)+NumCust(Delhi)) where w1, w2, w3 for Plan 1 estimate the unit costs of accessing the unstructured repository, the structured database, and the unified index, respectively. Once the cost estimate for Plan 3 is complete in 313 the method proceeds to 315.

In block 315 a unified query plan is selected, either the low cost plan as indicated in the cost estimates performed in blocks 309-311 or the default plan indicated in 307. The selection of which unified query plan to use determines the order of the queries (e.g. the order of the structured or unstructured structure type queries) and the order of accessing the unified index, as described further in conjunction with FIGS. 4A-B, 5A-B and 6A-B. Once the selected plan is indicated in 315 the method proceeds the proper block for performing that plan. If Plan 1 is selected the method proceeds from 315 to 317. If Plan 2 is selected the method proceeds from 315 to 319. If Plan 3 is selected the method proceeds from 315 to 321. Further details for Plan 1, Plan 2 and Plan 3 are provided in the text below, and illustrated in FIGS. 4A-B, FIGS. 5A-B and FIGS. 6A-B, respectively. Upon completing the unified query (e.g., one of blocks 317-321) the method proceeds to 323.

In some embodiments the system may rank the answers in block 321 from the unified query. Since keyword searches in both unstructured as well as structured databases using native indexes tend to be a fuzzy process, it is sometimes beneficial to rank the answers to the unified query and return the top-k queries. Generally, the ranking should be application specific. The ranking may be a combination of several factors such as the ranking of entities within the structured warehouse, the strengths/confidence of the implicit relationships, as well as the ranking of the documents retrieved from the unstructured repository. Thus, the middleware that embodies the present method is typically responsible for returning any matching answers with additional statistical information which the application can use for ranking as a post-processing step. The ranking can be used to provide a confidence level or an indication of quality for the results. Upon completing the ranking of the query results in 323 the method proceeds to 325 and ends.

Figure 4A:
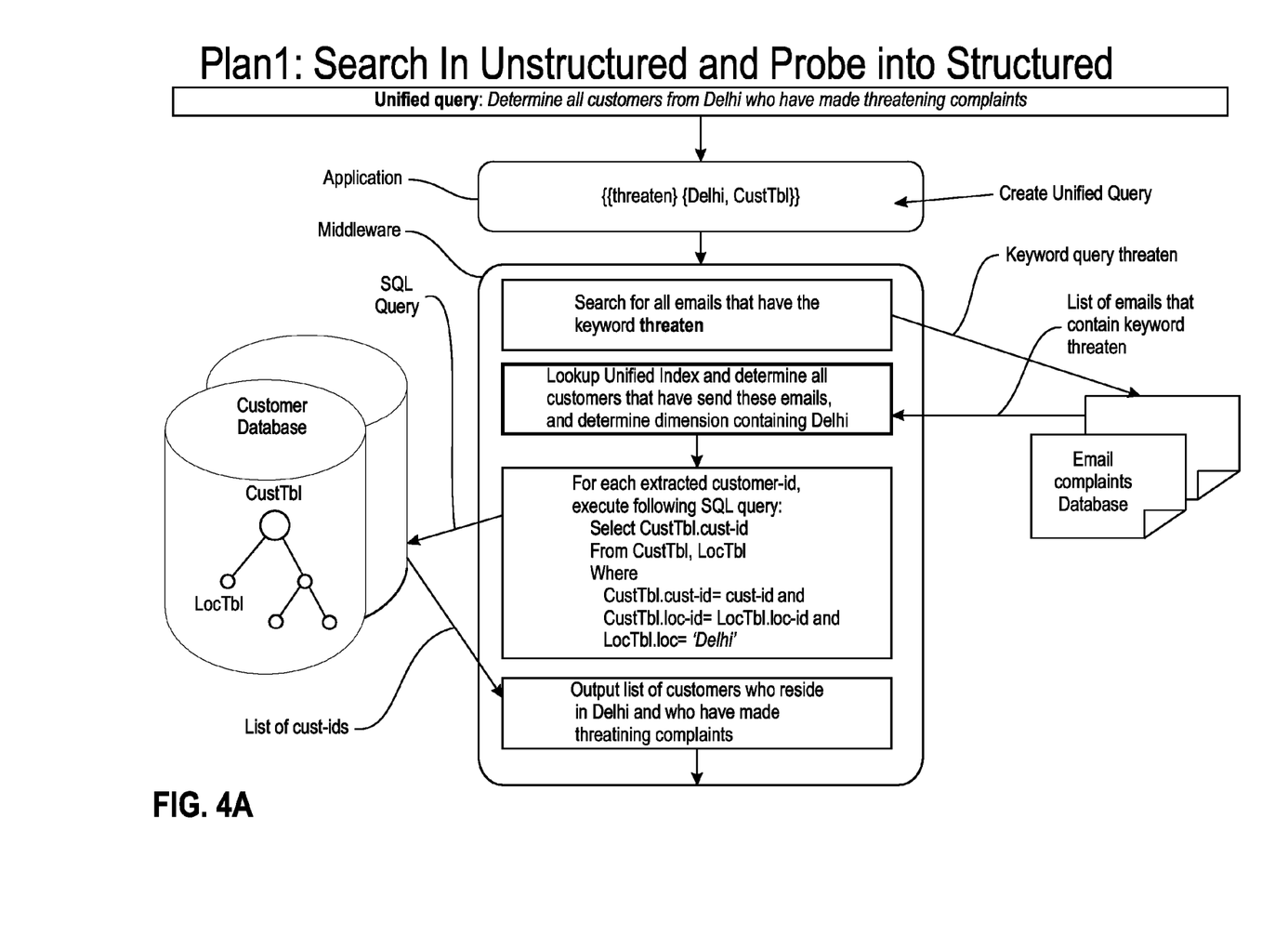
FIG. 4A depicts an exemplary embodiment for executing unified query plan 1 to search unstructured content and probe into structured content.

FIG. 4A depicts an exemplary embodiment of a system for executing unified query Plan 1 to search unstructured content and probe into structured content. Plan 1 entails first searching in the unstructured repository, then accessing the lookup unified index, and using the results to probe into the structured database. Plan 1 tends to be more efficient (e.g., low cost) if the expected results from the unstructured content is small. In this context, an expected "small" result may be pre-defined in absolute terms (e.g., 100 results, 10,000 results, 100,000 results, including numbers less than any of these, or other like numbers) or in relative terms (e.g., 0.1%, 1%, 10% of the total, including amounts less than these, or other like fractions).

Figure 4B:
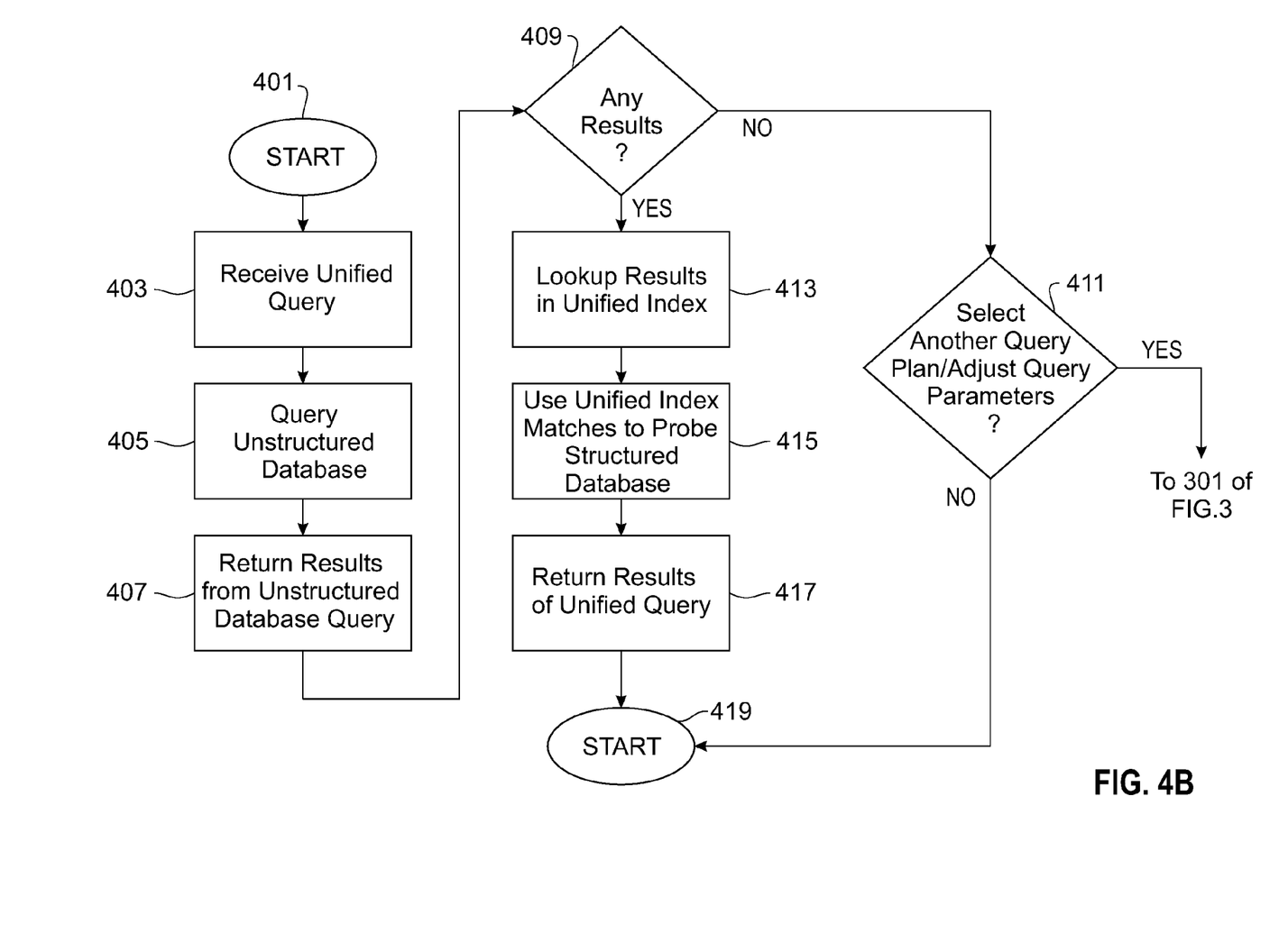
FIG. 4B depicts an exemplary embodiment of a method according to unified query plan 1 for searching unstructured content and probing into structured content.

FIG. 4B depicts an exemplary embodiment of a method according to unified query Plan 1 for searching unstructured content and probing into structured content. The method begins at 401 and proceeds to 403 where a unified query command is received. The unified query command may be a line of code, a statement or any other type of instruction, so long as it includes two parts—one part that is a query over an unstructured repository (e.g., a keyword query), and another part that is a query over a structured database which may refer to dimension values as well as fact table names. The two part keyword query may be in a format like: {{threaten} {Delhi, CustTbl}}, where "threaten" is a term to be used in a keyword search of an unstructured repository, and "Delhi" and "CustTbl" are terms to be used in the query of a structured database search. Once the unified query is received in 403 the method proceeds to 405.

In 405 the unstructured repository is queried. The unstructured repository query may involve a keyword search of a collection of documents, emails, text, web pages, or other content that is collected or otherwise accessible in an unstructured repository. In the example discussed above a collection of customer emails is searched for those emails containing the word "threaten." Once the unstructured content has been queried in accordance with the unified query command the method proceeds to 407 to return the results of the query. The results may be a list, pointers, or other indications of the query term(s) being satisfied. For example, the results may be a list of all emails in the repository that contain the word "threaten" (or an extension or equivalent of the word). The method then proceeds to 409.

In 409 it is determined whether there are any results or matches from the query of the unstructured repository. If there are no matches, the method proceeds from 409 along the "NO" path to 411 to either select another query plan or adjust the query parameters. If another query plan is selected or the query parameters are adjusted the method proceeds from 411 along the "YES" path to 301 of FIG. 3. However, if no adjustments are made and the query is abandoned the method proceeds from 411 along the "NO" path to 419 and ends. Returning to block 409, if there are results returned from the query of the unstructured content the method proceeds from 409 along the "YES" path to 413.

In 413 the results (e.g., emails containing "threaten") are looked up in the unified index to determine the identity of the customers who sent the emails. At this time the dimension may be determined containing the other search term for the structured database (e.g., Determine that "Delhi" is a customer location). The method proceeds to 415 to use the unified index matches (e.g., the customers who sent the emails) in a query of the structured database. In various implementations this may be done by an SQL query of the database to determine the location of the customers who sent the email, as depicted in FIG. 4A. Once the query of the structured database is completed the method proceeds to 417 to return the results of the unified query. The results may be outputted in any form deemed convenient and suitable for the user's purposes, e.g., a list of customer IDs, customer email address, or aggregate statistics such as the percentage of customers who sent threatening emails that are from Delhi, or other like output format. Once the unified query results are returned in 417 the method proceeds to 419 and ends.

Figure 5A:
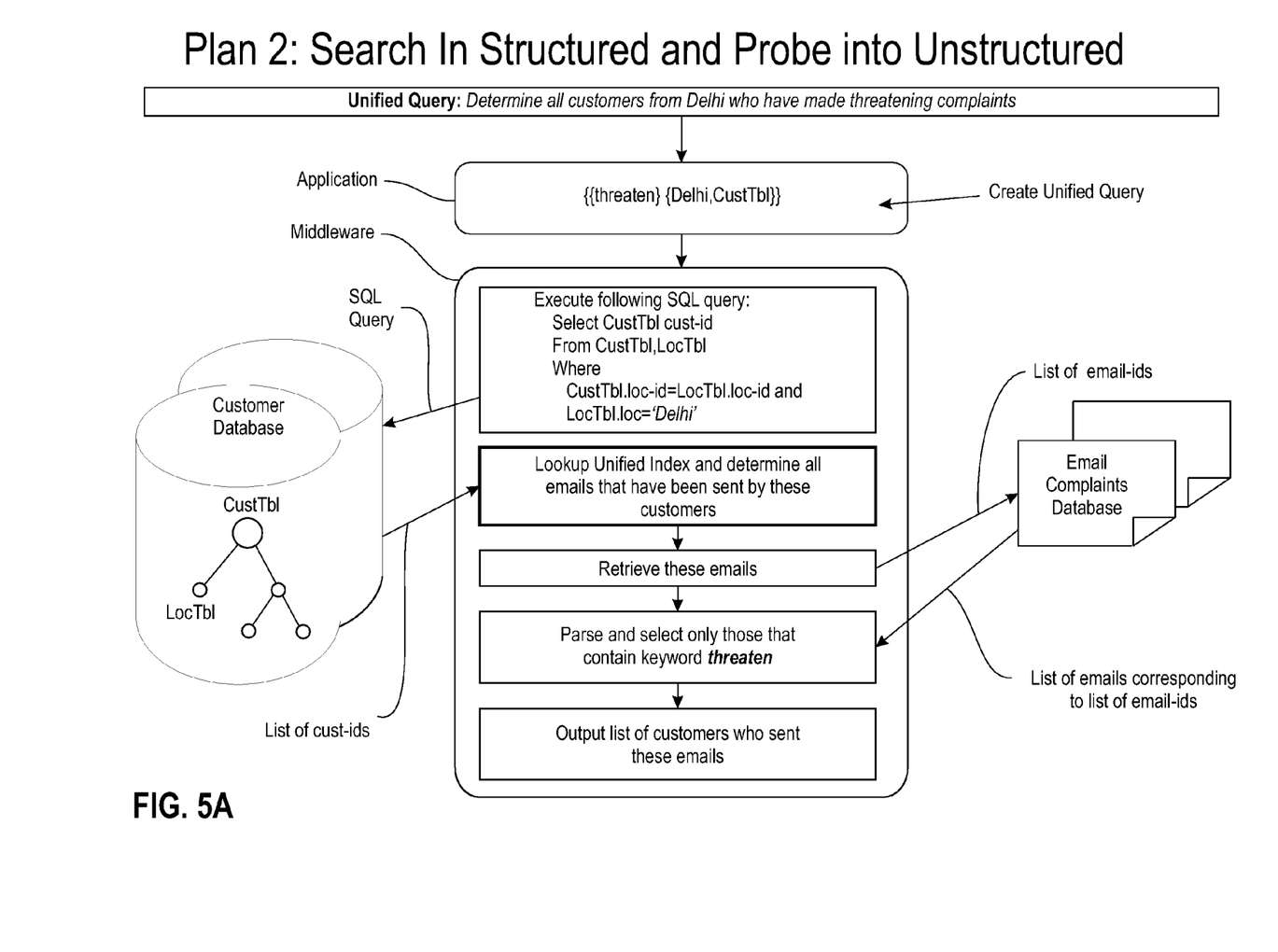
FIG. 5A depicts an exemplary embodiment for executing unified query plan 2 to search structured content and probe into unstructured content.

FIG. 5A depicts an exemplary embodiment of a system for executing unified query Plan 2 to search structured content and probe into unstructured content. Unified query Plan 2 first searches in the structured database, then accesses the lookup unified index, and then probes into the unstructured repository. Plan 2 is often more efficient to perform than the other unified query plans if the expected results from the structured content is relatively small.

Figure 5B:
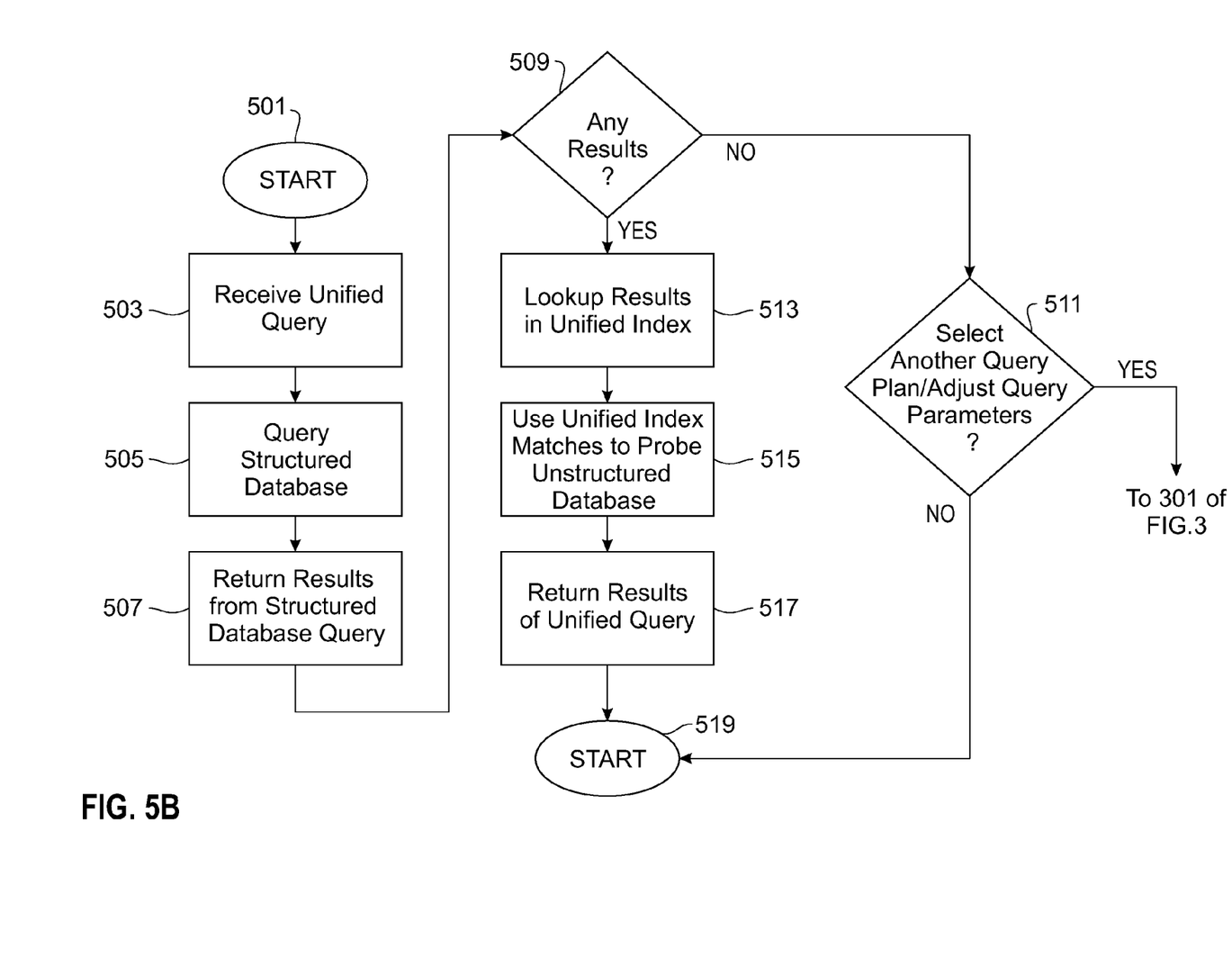
FIG. 5B depicts an exemplary embodiment of a method according to unified query plan 1 for searching structured content and probing into unstructured content.

FIG. 5B depicts an exemplary embodiment of a method according to unified query Plan 1 for searching structured content and probing into unstructured content. The method begins at 501 and proceeds to 503 where the unified query is received. The unified query may have an exemplary format such as: {{threaten} {Delhi, CustTbl}}. In some implementations the unified query may contain instructions for performing one of the plans (e.g., Plan 1, Plan 2, or Plan 3). Alternatively, the system may arrive at the decision to perform Plan 2 from the results of a cost estimate performed, for example, in accordance with the method described above in conjunction with FIG. 3. Once the search terms and any instructions are extracted from the unified query the method proceeds to 505.

In block 505 the structured database is queried. For example, returning to the example discussed above, the structured database query may involve retrieving or otherwise determining all customers that are from Delhi. The results of the structured database query are returned in 507 in any format convenient to the application. For example, the structured database query may produce a list of Delhi customers, or a group of pointers to those customers' records, or any other like type of indicators for Delhi customers. Once the structured database query has been completed in 505, and results are returned in 507, and the method proceeds to 509.

In block 509 it is determined whether there are any results from the unified Plan 2 query of the structured content, e.g., whether there are any customers from Delhi. If there are no results the method proceeds from 509 along the "NO" path to 511 for the possibility of selecting another unified query plan to perform instead. However, if it is determined in 509 that there are valid results from the structured content query the method proceeds from 509 along the "YES" path to 513. In 513 results from the structured database query (e.g., the IDs of Delhi customers) are looked up in the unified index. In the present example, the system uses the unified index to determine whether any emails have been received from Delhi customers. Emails pertaining to Delhi customers' are retrieved or otherwise indicated for a query to be performed. This may entail providing pointers or other indications of the subset of emails received from Delhi customers so as to enable a search of this subset of emails without the need to search all emails that are received.

The method then proceeds from 513 to 515 to use the results from the unified index to probe the unstructured repository. The probe of the unstructured repository is typically a query of a subset of the unstructured repository which has been narrowed by the results of the structured database query. In this example, the unstructured repository (received email text) is searched by querying only the emails of Delhi customers for the keyword "threaten." Narrowing the query of the unstructured repository in this manner tends to reduce the computational costs considerably, thus speeding up the query and increasing the efficiency of finding the desired result. Once the query of Delhi customers' email text has been completed to search for the term "threaten" the method proceeds from 515 to 517. In 517 the results of the Plan 2 unified query are returned in any format convenient to the user or the application. For example, the results may be returned in the form of a list of Delhi customers who have sent emails with threatening complaints. The result may include any statistics deemed useful, such as the number threatening emails sent by each Delhi customer, the dates of the emails, or even the general topic of such threatening emails (e.g., delivery complaint, software complaint, assembly complaint). Once the results have been returned the method proceeds to 519 and ends.

Figure 6A:
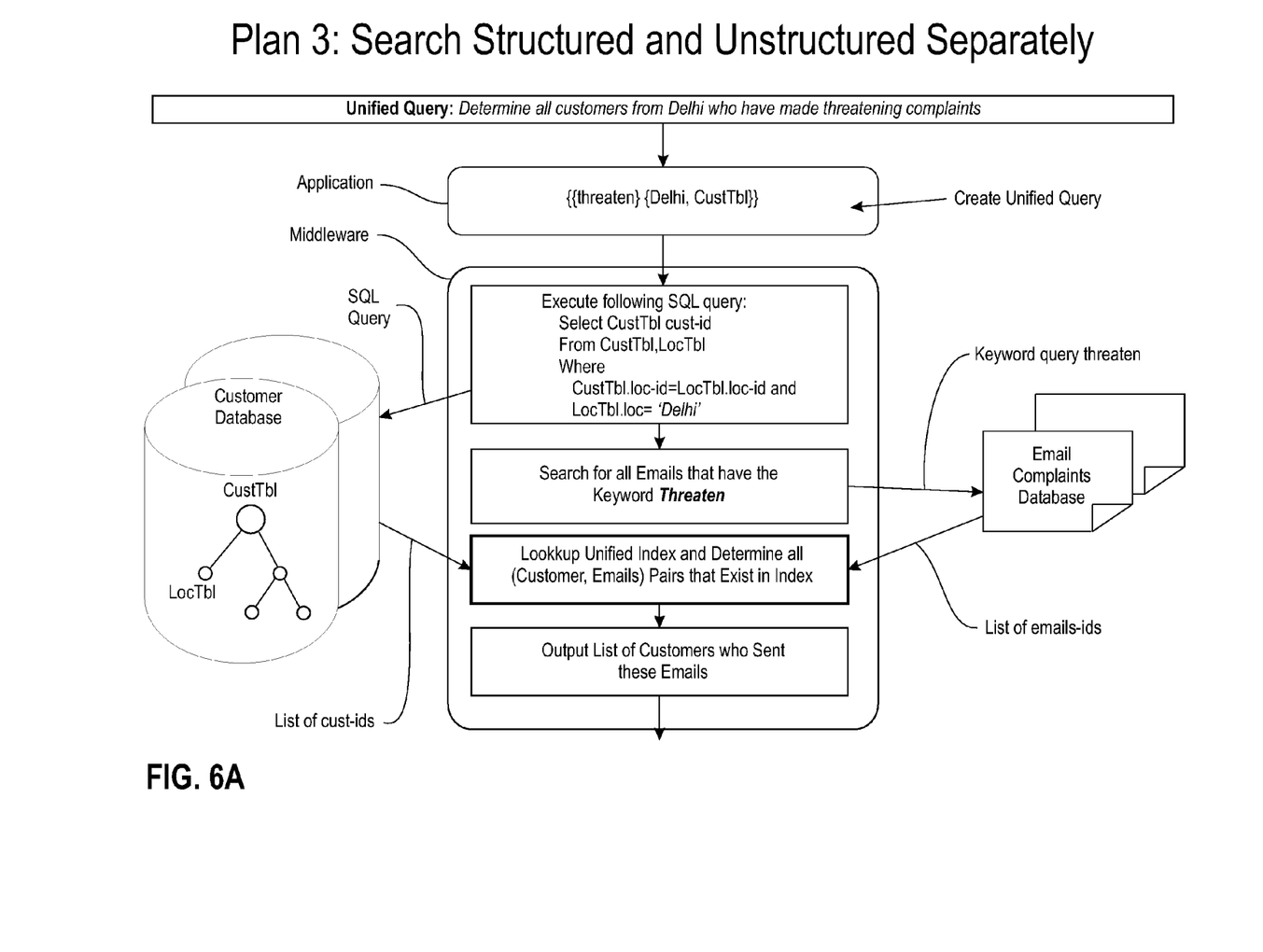
FIG. 6A depicts an exemplary embodiment for executing unified query plan 3 to search the structured content and unstructured content separately and compare for matches.

FIG. 6A depicts Plan 3, an exemplary embodiment of a system for executing a unified query by search structured content and unstructured content separately. Plan 3 entails searching both structured and unstructured databases separately, then accessing the lookup unified index to determine in-between links. Plan 3 is often more efficient when the results from both the unstructured and the structured content are expected to be relatively small.

Figure 6B:
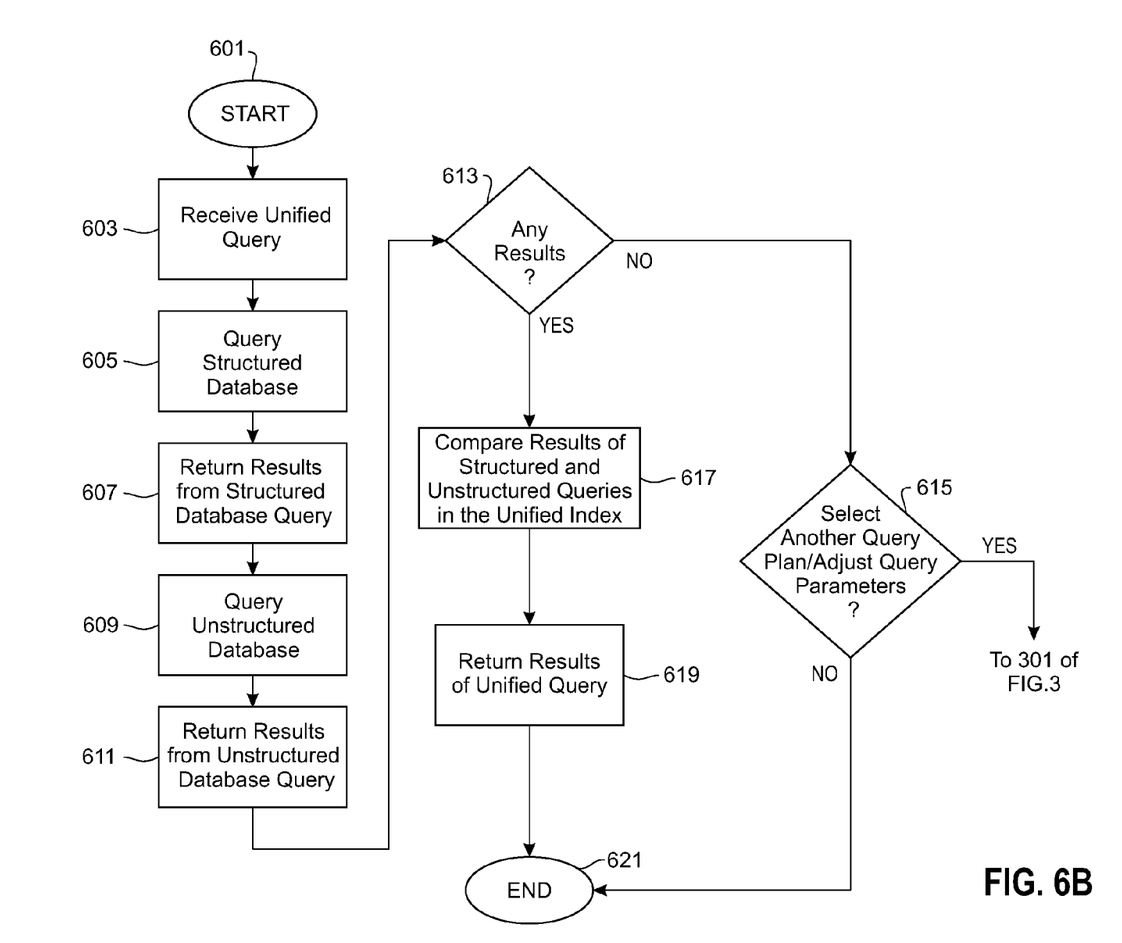
FIG. 6B depicts an exemplary embodiment of a method according to unified query plan 3 for searching the structured content and unstructured content separately and comparing for matches.

FIG. 6B depicts an exemplary embodiment of a method according to unified query Plan 3 for searching the structured content and unstructured content separately and comparing for matches. The method begins at 601 and proceeds to 603 where the unified query is received. The unified query may have an exemplary format such as: {{threaten} {Delhi, CustTbl}}, or any other form suitable for conveying the search terms and any instructions needed to begin the unified query. The method then proceeds to 605 to perform a query of the structured database. For example, the structured database query may entail determining all customers who are from Delhi. Once the structured database query has been completed and the results returned in 607 the method proceeds to 609 to query the unstructured repository. For example, the unstructured repository query may be a search of all emails for the term "threaten" (e.g., either in the email text, meta data, or otherwise associated with the email). Once the unstructured repository query has been completed and the results returned in 611 the method proceeds to 613.

Block 613 determines whether there are any valid results from the structured database query and/or the unstructured repository query. If no results were returned the method proceeds from 613 along the "NO" path to 615. In block 615 it is decided whether or not another type of query is to be performed, e.g., plan 1 or plan 2. If another query is to be performed the method proceeds from 615 along the "YES" path to 301 of FIG. 3. Alternatively, if the query plan to be performed is already known, the method may proceed from 615 either to 401 of FIG. 4B or to 501 of FIG. 5B. If it is determined in 615 that no other query plan is to be performed the method proceeds from 615 along the "NO" path to 621 and ends.

Returning to block 613, if it is determined that valid results have been returned from the queries the method proceeds from 613 along the "YES" path to 617. In block 617 the unified index is used to compare the results of the structured database query and the unstructured repository query. In this way the customers sending threatening complaint emails can be cross-checked against customers from Delhi to determine Delhi customers who sent threatening emails. Once the results of the structured and unstructured database queries have been compared in 617 the method proceeds to 619 to return the results, providing an indication of the customers from Delhi who sent threatening emails. The method then proceeds to 621 and ends.

Figure 7:
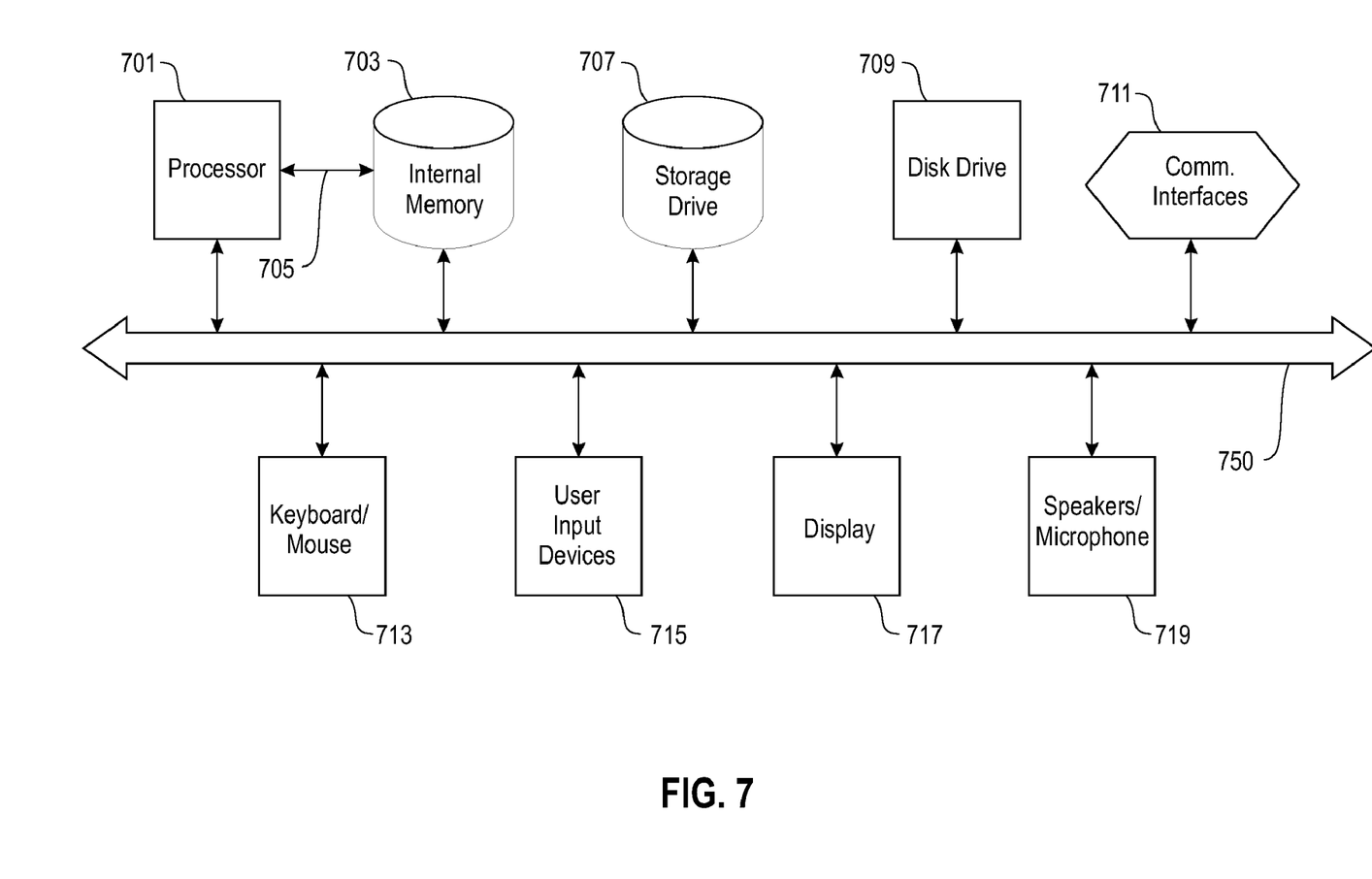
FIG. 7 depicts an exemplary computer system 600 that may be used to implement various embodiments of the invention.

FIG. 7 depicts an exemplary computer system 700 that may be used to implement various embodiments of the invention. The computer system 700 includes a processor 701 which may be embodied as a microprocessor or central processing unit (CPU). The processor 701 is typically configured to access an internal memory 703 via a bus such as the system bus 750. The internal memory 703 may include one or more of random access memory (RAM), read-only memory (ROM), cache memory, or a combination of these or other such circuitry configured to store information in a retrievable format. In some implementations the internal memory 703 may be configured as part of the processor 701, or separate from it but within the same packaging. The processor 701 may be able to access internal memory 703 via a different bus, or via control lines (e.g., local bus 705) than it uses access the other components of computer system 700.

The computer system 700 also typically includes, or has access to, one or more storage drives 707 and floppy disk drives 709. The storage drive 707 is often a hard disk drive configured for the storage and retrieval of data, computer programs or other information. The floppy disk drives 709 may include a combination of several disc drives of various formats that can read and/or write to removable machine readable medium. The machine readable medium may be any of the various available storage formats, including, for example, CD-R, CD-RW, DVD, DVD-R, floppy disk, or the like. The computer system 700 may either include the storage drives 707 and floppy disk drives 709 as part of its architecture (e.g., within the same cabinet or enclosure), as connected peripherals, or may access the storage drives 707 and floppy disk drives 709 over a network, or a combination of these. The storage drive 707 is often used to store the software, instructions and programs executed by the computer system 700.

The computer system 700 may include communication interfaces 711 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 700 may be interconnected by a bus 750 and/or may include expansion slots conforming to any of various industry standards such as PCI (Peripheral Component Interconnect), ISA (Industry Standard Architecture), or EISA (enhanced ISA).

Typically, the computer system 700 includes one or more user input/output devices such as a keyboard and/or mouse 713, or other means of controlling the cursor (e.g., touchscreen, touchpad, joystick, trackball, etc.) represented by the user input devices 715. A display 717 is also generally included as part of the computer system 700. The display may be any of several types of displays, including a liquid crystal display (LCD), a cathode ray tube (CRT) monitor, a thin film transistor (TFT) array, or other type of display suitable for displaying information for the user. The display 717 may include one or more light emitting diode (LED) indicator lights, or other such display devices. In addition, most computer systems 700 also include, or are connected to, one or more speakers and microphones 719 for audio output and input. Speech recognition software may be used in conjunction with the microphones 719 to receive and interpret user speech commands.

In regards to the methods disclosed herein for practicing the various embodiments, many of the specified activities and steps may be included, or excluded, or performed in a different order than described above, with the rest of the activities still remaining within the scope of at least one exemplary embodiment. For example, the determination of whether any valid results were obtained from the database search (e.g., blocks 409 and 509) may be performed after both the structured and unstructured databases have been queried. In another example, the unstructured repository query of plan 3 (blocks 609-611) may be performed before the structured database query (blocks 605-607). Other activities may either be omitted or performed in a different order than depicted in the exemplary figures included herein or descriptions thereof, and still be within the scope of the invention.

The invention may be implemented with any sort of processing units, processors and controllers (e.g., processor 701 of FIG. 7) capable of executing a program of instructions for performing the stated functions and activities. For example, the processor 701 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the internal memory 703 or storage drive 707, e.g. hard disk, CD, flash memory, ram, or other machine readable medium as recognized by one of ordinary skill in the art. The computer software or other programs of instructions can aid or perform the steps and activities described above. For example computer programs in accordance with at least one exemplary embodiment may include: source code for dynamically selecting an efficient approach to answer a query including source code for accessing a unified index associated with a first data repository of a first structure type and a second data repository of a second structure type; source code for querying the first data repository of the first structure type; and source code for querying the second data repository based on results of the querying of the first data repository, wherein the first and second data repositories are decided at query time using statistics. There are many further source codes that may be written to perform the stated steps and procedures above, and these are intended to lie within the scope of exemplary embodiments.

The term "database" is used throughout this disclosure in describing a collection of structured data or a repository of unstructured data. A structured database may be data organized within a database management system (DBMS), a relational database management system (RDBMS), or other such organized structure for compiling, managing and manipulating data instances and interrelationships between the data (e.g., a spreadsheet). An unstructured database, as this term is used herein, may be a collection, compilation or other repository of unstructured data such as email, documents, webpages, text, images, or other content that is collected or otherwise accessible in the unstructured repository.

The use of the word "exemplary" in this disclosure is intended to mean that the embodiment or element so described serves as an example, instance, or illustration, and is not necessarily to be construed as preferred or advantageous over other embodiments or elements. For ease of illustration the terms "unstructured database" and "structured database" are written herein in a form consistent with singular nouns. However, as these terms pertain to the various embodiments, the term "unstructured database" may include multiple unstructured databases, and "structured database" may include multiple structured databases.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A computer-implemented method for dynamically querying structured and unstructured data repositories, the method comprising:
    maintaining, by a computer, a unified index associated with a structured data repository and an unstructured data repository;
    receiving, by the computer, a unified query of keywords including a first keyword for querying the structured data repository and a second keyword for querying the unstructured data repository;
    first querying, by the computer, one of the structured data repository and the unstructured data repository;
    if first querying the structured data repository, then, using the computer, matching the unified index to first querying results with the first keyword, and using unified index matches to limit second querying of the unstructured data repository with the second keyword; and
    if first querying the unstructured data repository, then, using the computer, matching the unified index to first querying results with the second keyword, and using unified index matches to limit second querying of the structured data repository with the first keyword,
    wherein the first querying of the one of the structured data repository and the unstructured data repository is decided at query time using occurrence statistics for the keywords, thereby selecting an efficient approach to answer a query.

2. The method of claim 1, wherein:
    the unified index stores the occurrence statistics for the keywords;
    the structured data repository comprises a structured database including table names and dimensional values of table that include the first keyword; and
    the unstructured data repository comprises unstructured text that includes the second keyword.

3. The method of claim 2, further comprising:
    performing a cost analysis, based on the occurrence statistics of keywords, to determine an order for querying the unstructured data repository and, the structured data repository.

4. The method of claim 3, the method further comprising:
    crawling the unstructured data repository and the structured data repository; and
    developing the unified index of the unstructured data repository and the structured data repository.

5. The method of claim 1, wherein the structured data repository and the unstructured data repository are autonomous.

6. A non-transitory computer program storage device readable by a computer, tangibly embodying a program of instructions executable by the computer to perform a method for dynamically querying structured and unstructured data repositories, the method comprising:
    maintaining a unified index associated with a structured data repository an unstructured data repository;
    receiving a unified query of keywords including a first keyword for querying the structured data repository and a second keyword for querying the unstructured data repository;
    first querying one of the structured data repository and the unstructured data repository with a keyword;
    if first querying the structured data repository, then matching the unified index to first querying the results with the first keyword, and using unified index matches to limit second querying of the unstructured data repository with the second keyword; and
    if first query the unstructured data repository, then matching the unified index to first querying results with the second keyword, and using unified index matches to limit second querying of the structured data repository with the first keyword,
    wherein the first querying of the one of the structured data repository and the unstructured data repository is decided at query time using occurrence statistics for the keywords.

7. The non-transitory computer program storage device of claim 6, wherein:
    the unified index stores occurrence statistics for the keywords;

the structured data repository comprises a structured database including table names and dimensional values of tables that include the first keyword; and the unstructured data repository comprises unstructured text that includes the second keyword.

8. The non-transitory computer program storage device of claim 7, wherein the method further comprises:

performing a cost analysis, based on the occurrence statistics of the keyword, to determine an order for querying the unstructured data repository and, the structured data repository.

9. the non-transitory computer program storage device of claim 6, wherein the method further comprises:

developing the unified index of the unstructured repository and the structured database by crawling the unstructured repository and the structured database.

10. A non-transitory computer program storage device readable by a computer, tangibly embodying a program of instructions executable by the computer to perform a method for unified querying an unstructured data repository and a structured data repository, the method comprising:

maintaining a unified index associated with the structured data and the unstructured data repositories, wherein:

the unified index stores occurrence statistics for keywords associated with the structured data and the unstructured data repositories;

the structured data repository comprises table names and dimensional values of tables that include the keywords; and the unstructured data repository comprises text that includes the keywords;

receiving a unified query of keywords including a first keyword for querying the structured data repository and a second keyword for querying the unstructured data repository;

performing a cost analysis to dynamically select an efficient plan to answer a unified query, wherein the cost analysis is based on the occurrence statistics for the keyword, wherein the plan comprises one of:

a first plan comprising a first querying of the structured data repository, then matching the unified index to first querying results with the first keyword, and using unified index matches to limit second querying of the unstructured data repository with the second keyword;

a second plan comprising a first querying of the unstructured data repository, then matching the unified index to first querying results with second keyword, and using unified index matches to limit second querying of the structured data repository with the first keyword; and a third plan comprising a first querying of the structured data repository and a second querying of the unstructured data repository.

11. A computer system configured for dynamically querying structured and unstructured data repositories, the computer system comprising:

a processor configured to:

maintain a unified index associated with a structured data repository and an unstructured data repository;

receive a unified query of keywords including a first keyword for querying the structured data repository and a second keyword for querying the unstructured data repository;

first query one of the structured data repository and the unstructured data repository with a keyword;

if first querying the structured data repository, then matching the unified index to first querying results with the results first keyword, and using unified index matches to limit second querying of the unstructured data repository with the second keyword; and if first querying the unstructured data repository, then matching the unified index to first querying results with the second keyword, and using unified index matches to limit second querying of the structured data repository with the first keyword, wherein the first query of the one of the structured data repository and the unstructured data repository is decided at query time using occurrence statistics for the keywords; and a memory configured to store the occurrence statistics for the keywords, table names and dimensional values of tables that include the first keyword, and unstructured text that includes the second keyword.

12. A computer-implemented method for unified querying of an unstructured data repository and a structured data repository, the method comprising:

maintaining, by a computer, a unified index associated with the structured data and the unstructured data repositories, wherein:

the unified index stored occurrence statistics for keywords associated with the structured data and the unstructured data repositories;

the structured data repository comprises table names and dimensional values of tables that include the keywords; and the unstructured data repository comprises text that includes the keywords;

receiving, by the computer, a unified query of keywords including a first keyword for querying the structured data repository and a second keyword for querying the unstructured data repository;

performing, by the computer, a cost analysis to dynamically select an efficient plan to answer a unified query, wherein the cost analysis is based on the occurrence statistics for the keywords, wherein the plan comprises one of:

a first plan comprising a first querying of the structured data repository, then matching the unified index for first querying results with the first keyword, and using unified index matches to limit second querying of the unstructured data repository with the second keyword;

a second plan comprising a first querying of the unstructured data repository, then matching the unified index to first querying results with the second keyword, and using unified index matches to limit second querying of the structured data repository with the first keyword; and a third plan comprising a first querying of the structured data repository and a second querying of the unstructured data repository.

* * * * *